Oct. 25, 1955    H. B. ROBERTS ET AL    2,721,341
DUAL-WELT PLASTIC SHIP
Filed Jan. 19, 1953    10 Sheets-Sheet 10
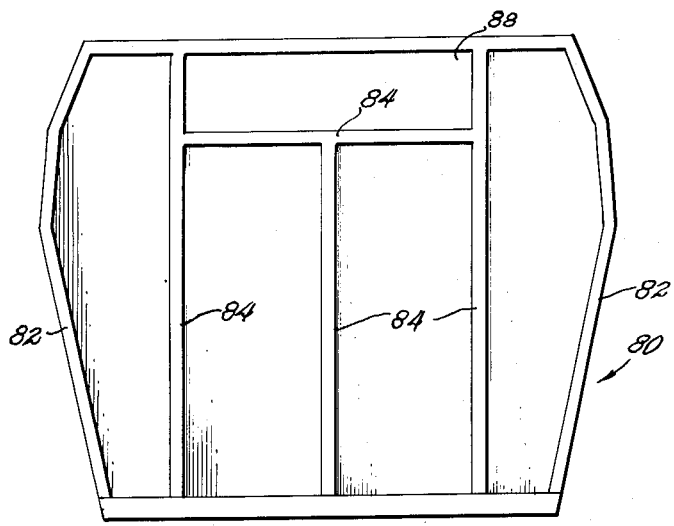
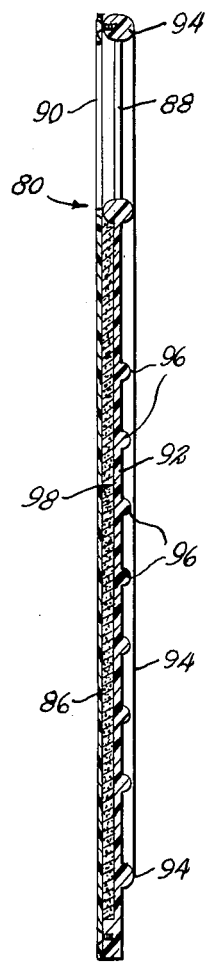
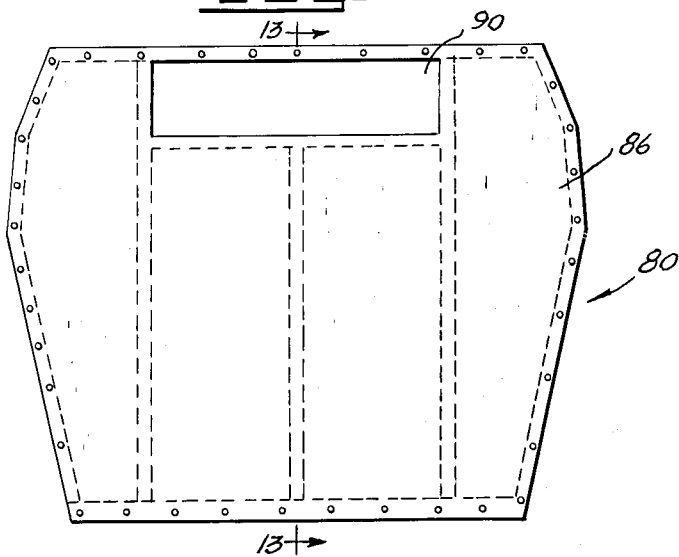
INVENTOR
Henry B. Roberts
Elwood S. Wood, Jr.
BY Mason, Mason & Sheridan
ATTORNEYS

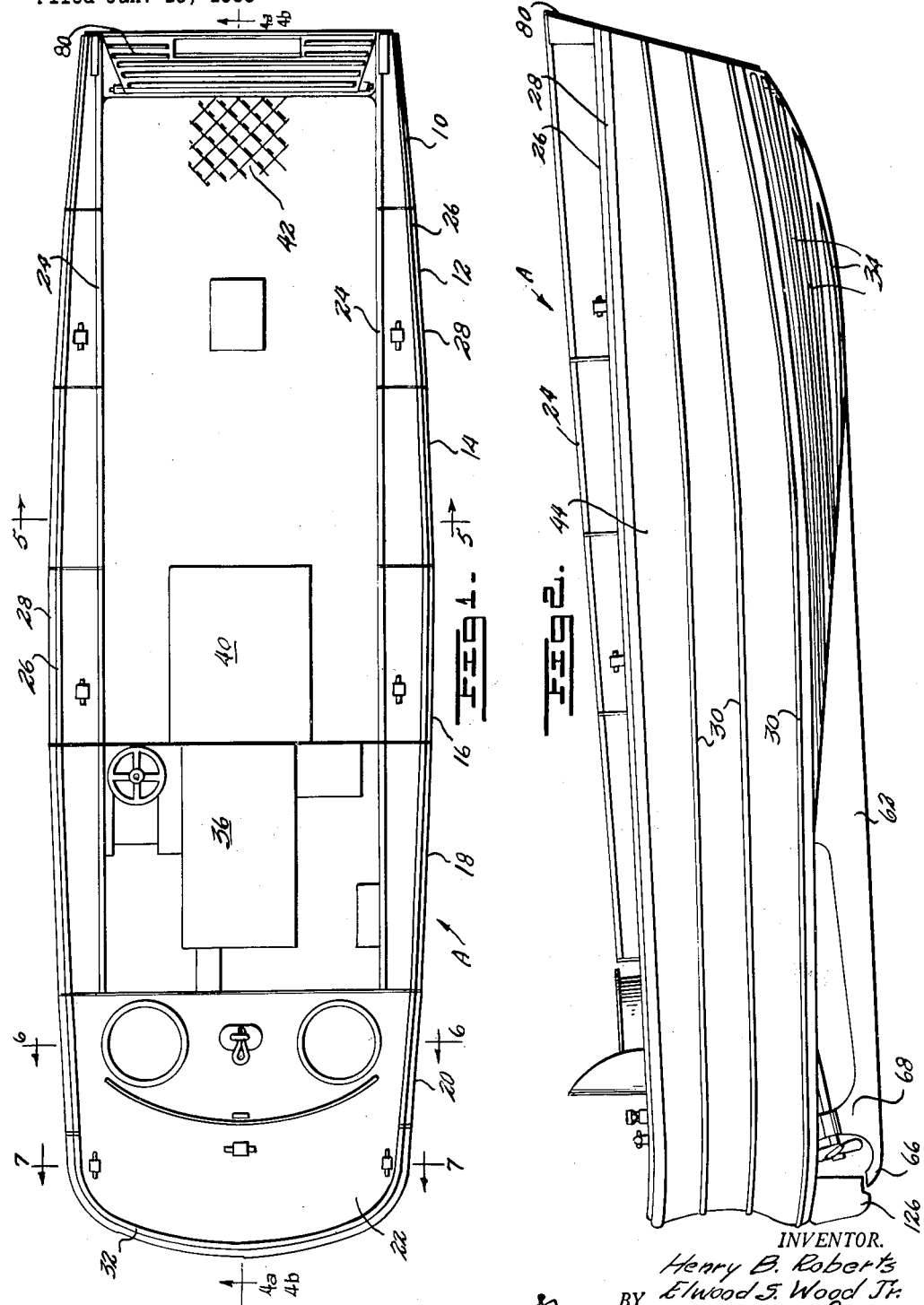

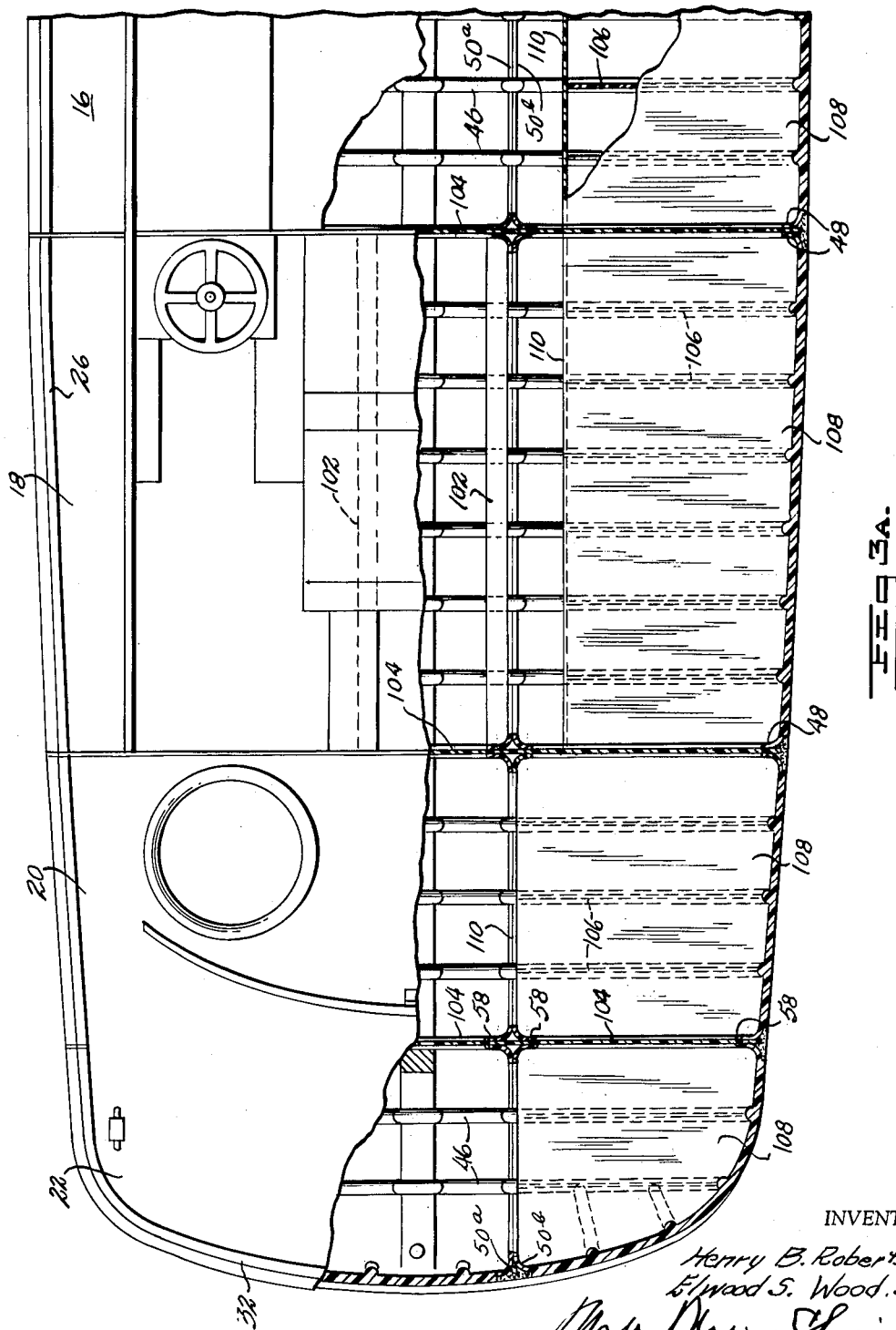

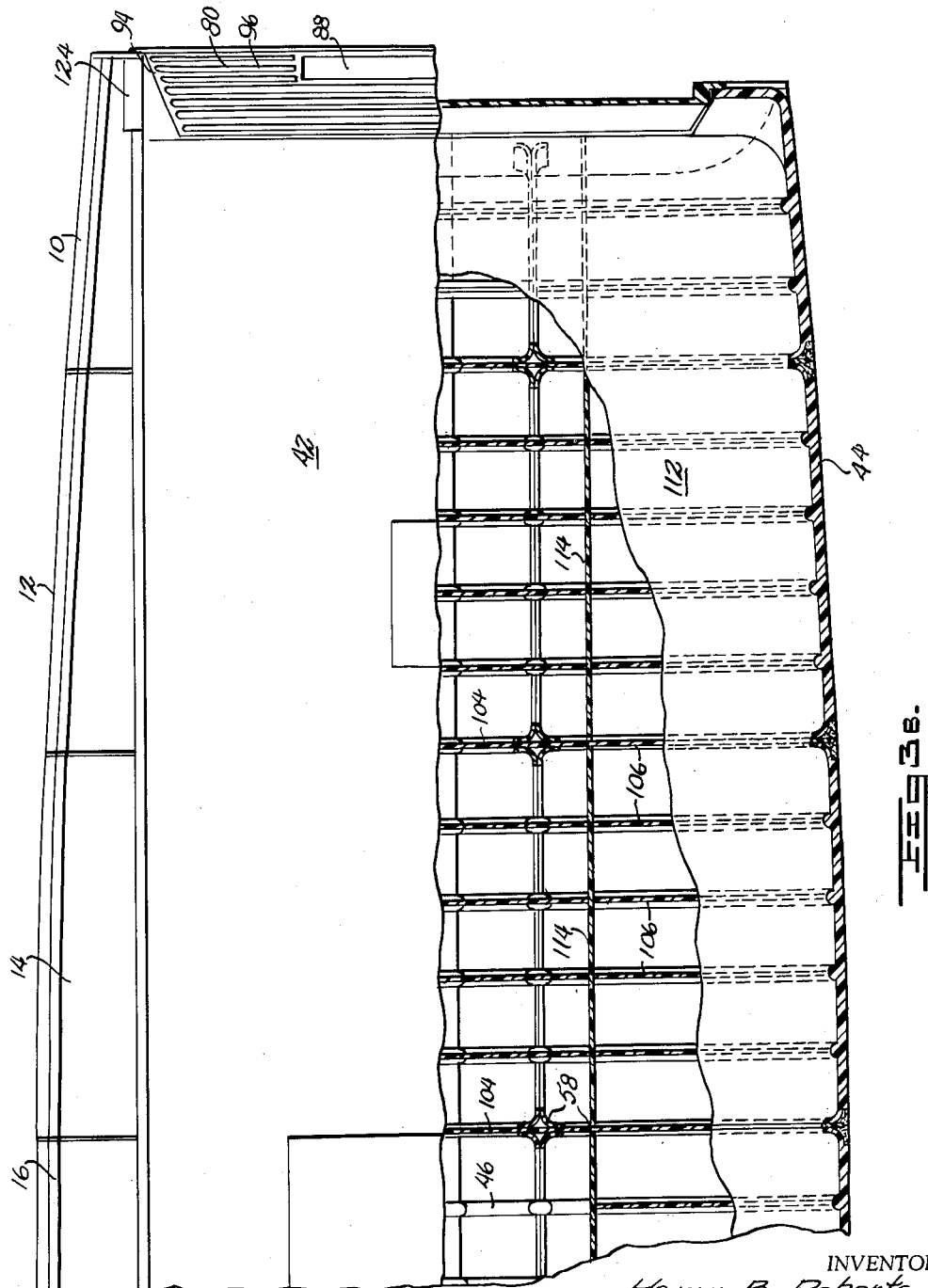

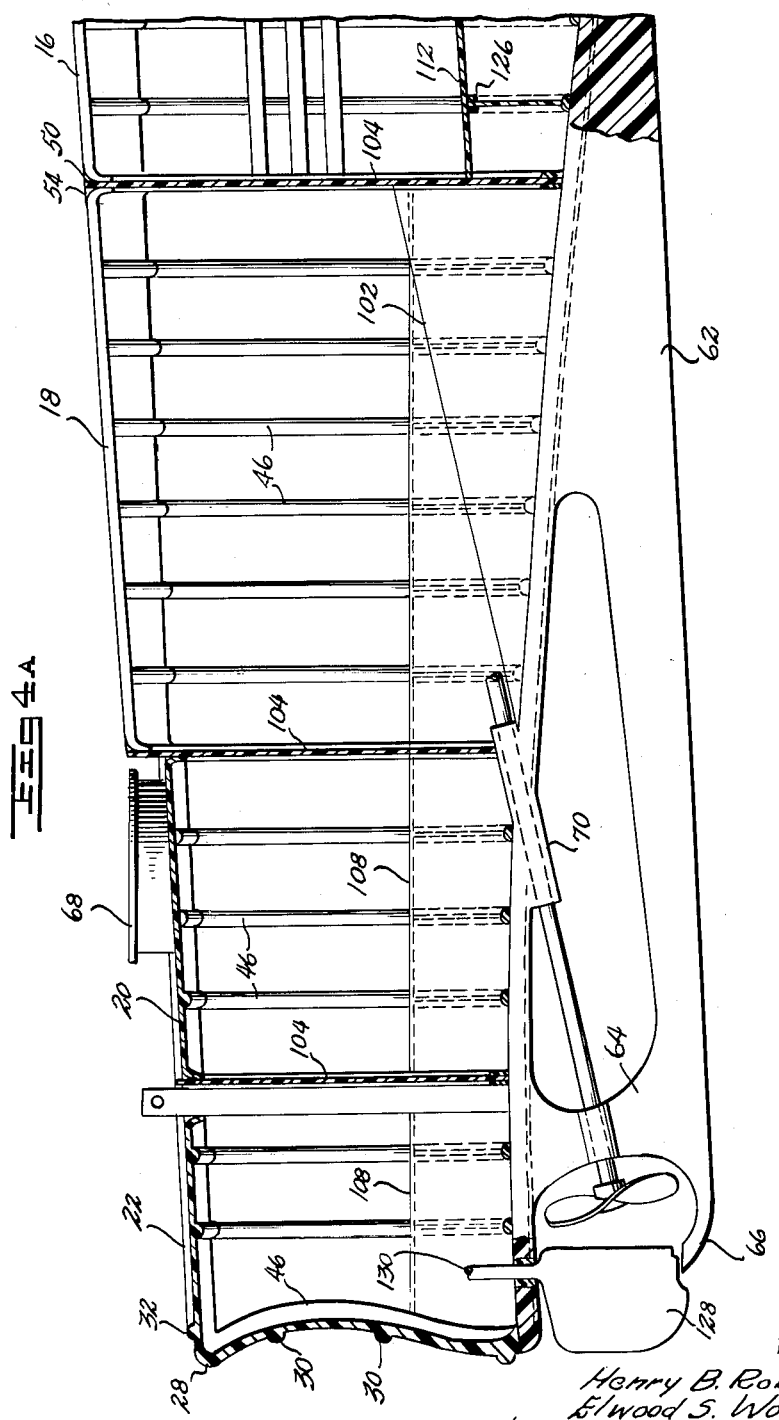

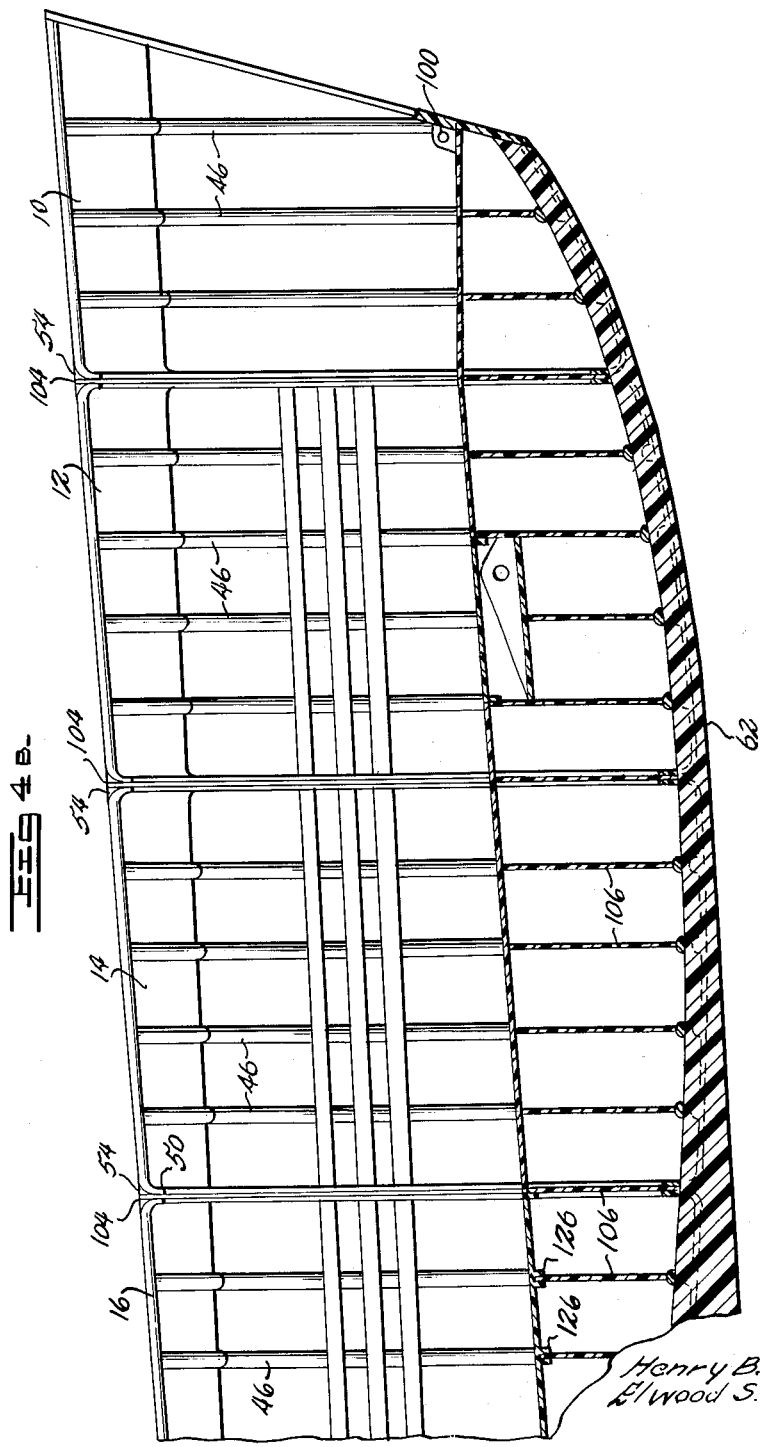

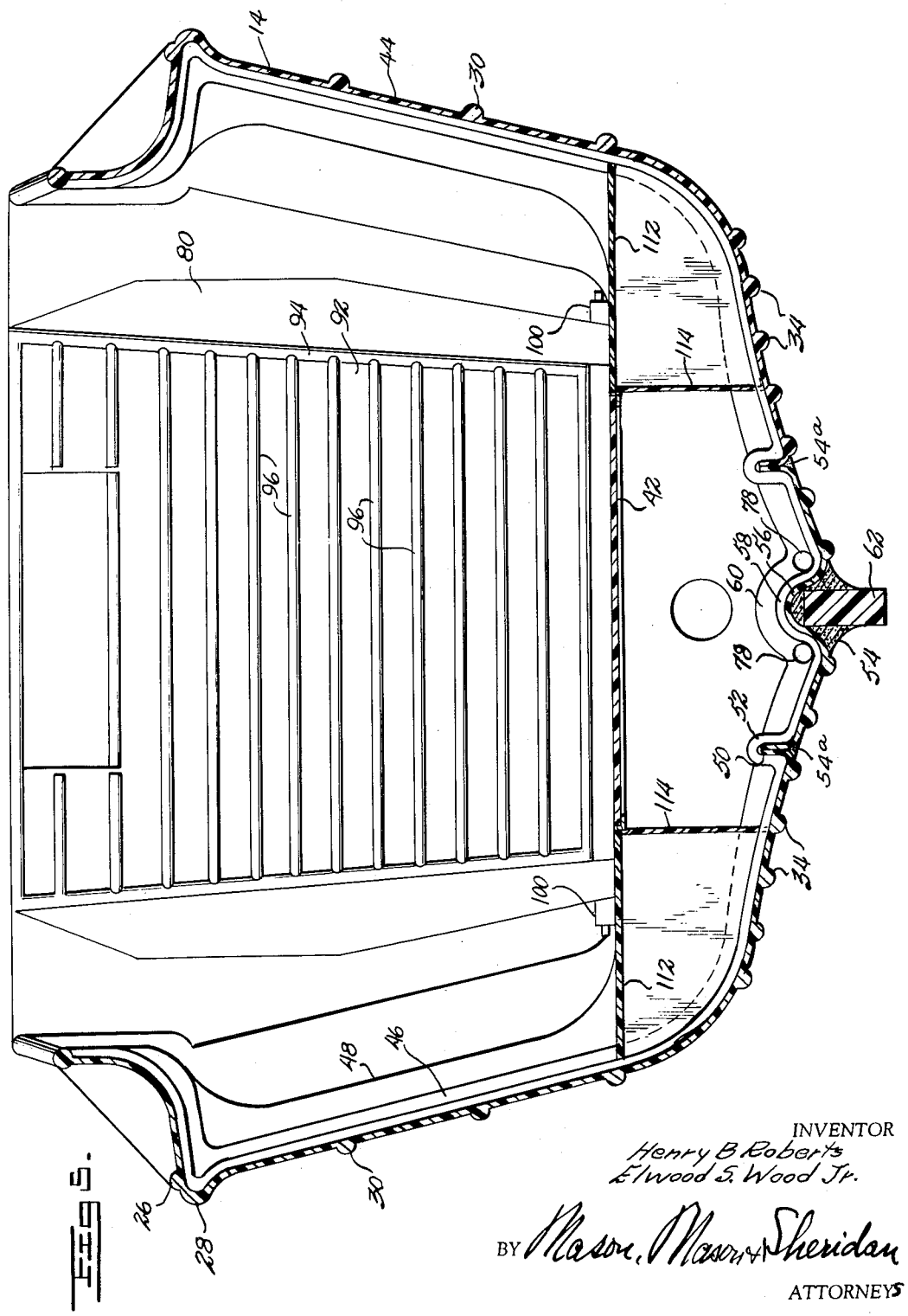

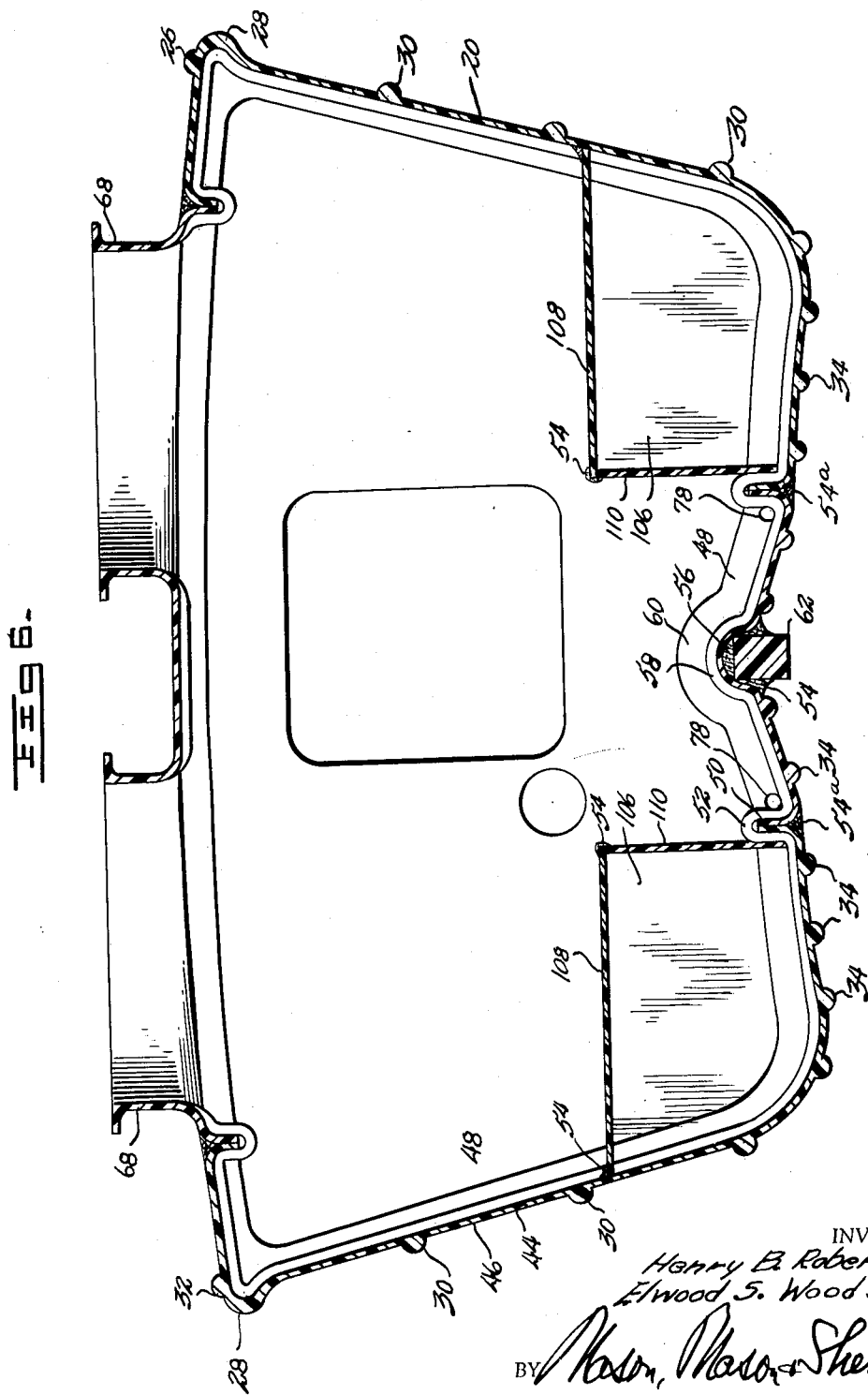

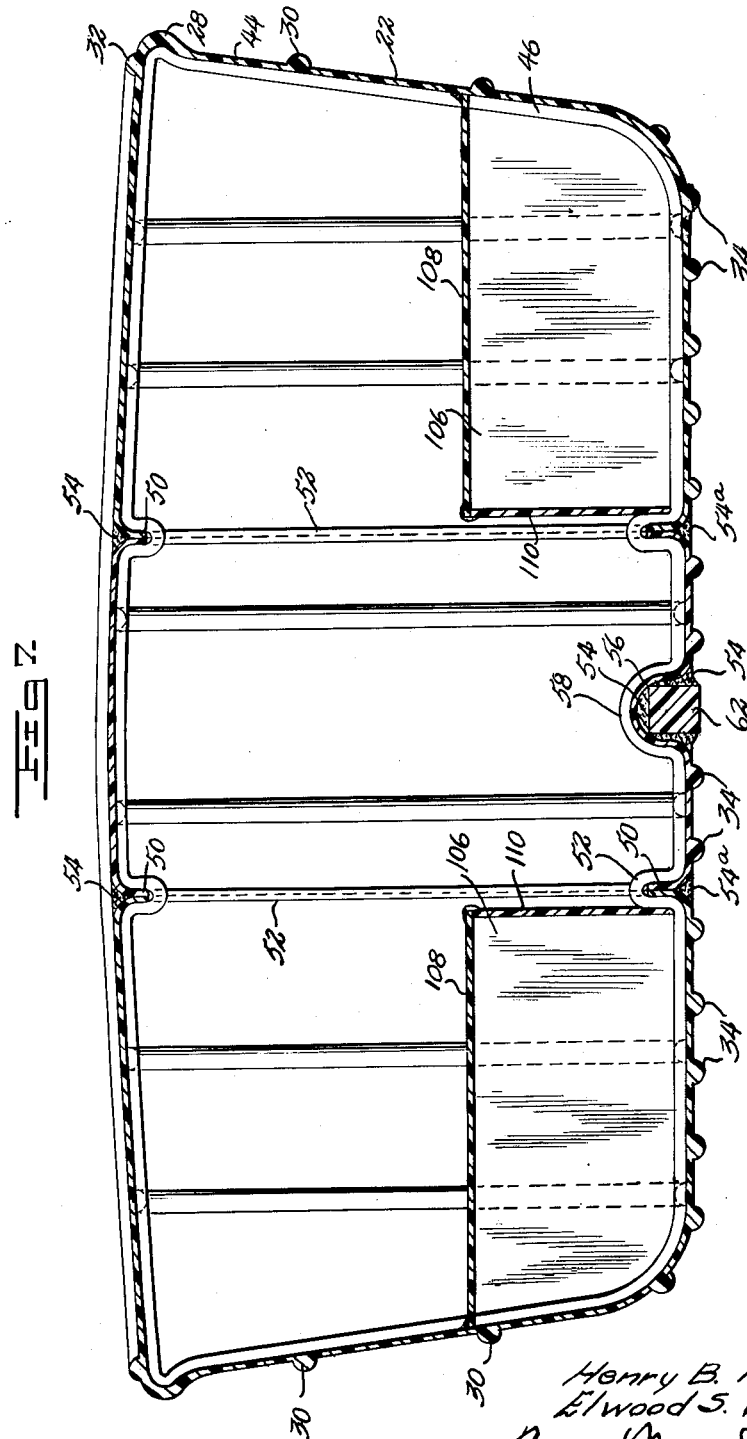

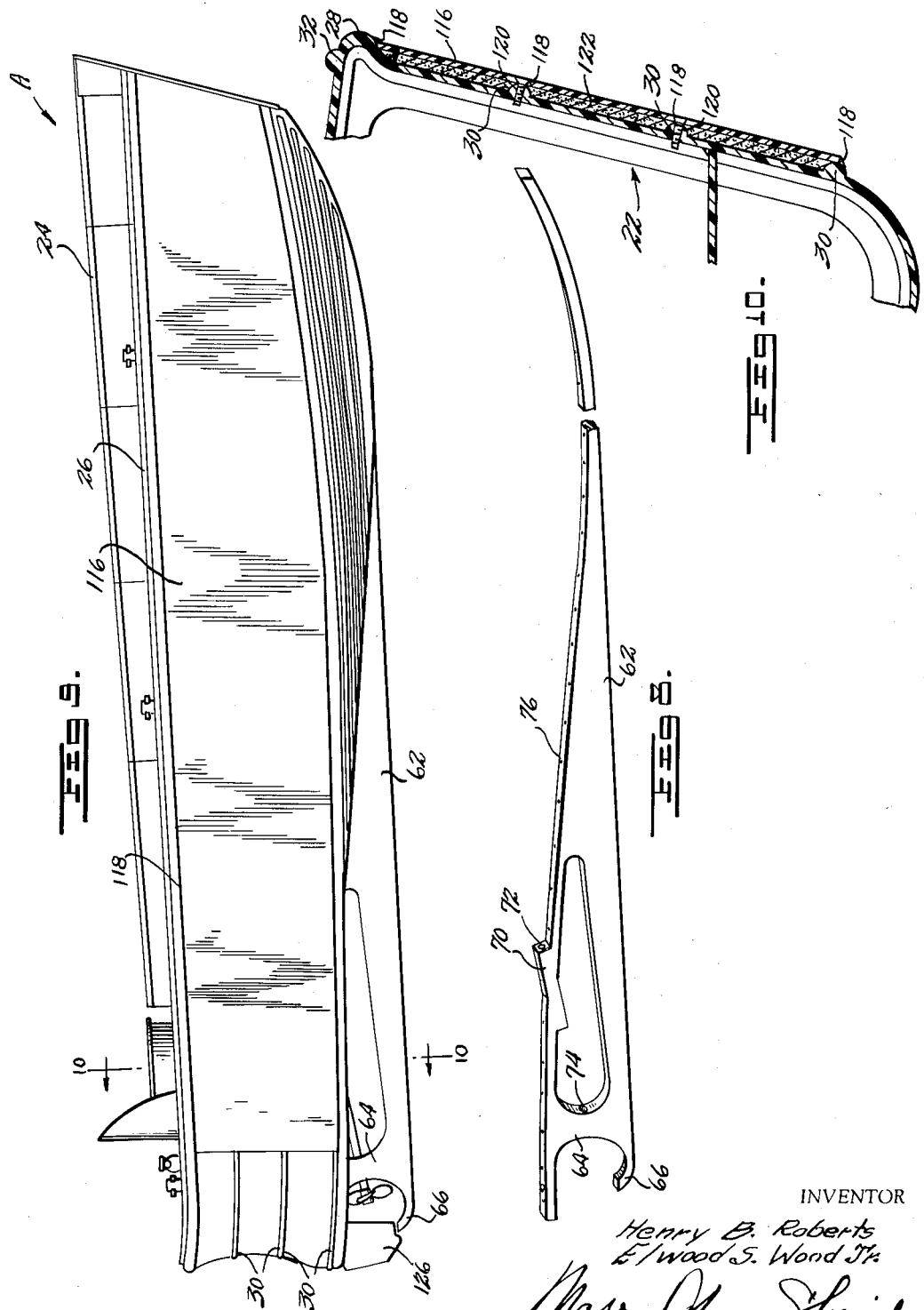

United States Patent Office 2,721,341
Patented Oct. 25, 1955

2,721,341
DUAL-WELT PLASTIC SHIP

Henry B. Roberts and Elwood S. Wood, Jr., Salisbury, Md., assignors to Roberts Industries, Salisbury, Md., a partnership Application January 19, 1953, Serial No. 331,934

9 Claims. (Cl. 9—6)

The present invention is concerned with ship or boat hulls composed of plastic materials.

The primary object of the invention is the provision of ship or boat hulls of plastic material having features of construction that give greater strength to their structure than when made by the "single lay-up" construction method, regardless of their size or power, and at the same time enables such hulls to be composed of a plurality of individual sections, preformed or manufactured at a convenient place and shipped in nested arrangement to a staging point where the sections may be assembled and formed into homogeneous monolithic hulls of plastic material.

A principal object of the invention is to provide a plastic hull for a vessel, as above defined, wherein the sections are joined together solely by plastic means which form reinforcing elements against compression and tension forces.

Also a principal object of the invention is the provision of such a hull as permits a ship or boat to be constructed which will not influence or be influenced by magnetic devices but which may be armored, where necessary or desirable.

Another object of the invention is to so shape certain marginal areas of said plastic hull sections that, when arranged in a hull assembly, their adjacent portions are arcuately directed inboard to provide a relatively wide recess or groove for the reception of a plastic filler material which is built-up fair with the fairing lines of the hull, producing a homogeneous joining connection of great strength.

A further object of the invention is to provide the joined plastic sections of a hull, as just described, with a series of spaced welts inboard of the hull and transversely of and following the outline of said joint or seam and homogeneous with the surfaces of said sections and joint.

Also a further object of the invention is to provide a plastic member extending transversely of the hull at the juncture of all, or certain of, said joined sections, such member being either a bulkhead or a belt-frame or rib, with its outboard marginal edge interposed between the faying surfaces of said sections and homogeneously incorporated in said joint by a plastic fillet of said joint.

An additional object of the invention is to so shape the bottom of all, or certain of, said plastic hull sections so as to serve the function of a keelson, thus eliminating the need of an internal separate keelson.

Still another object of the invention is the provision of separate bottom sections for said hull formed with marginal edge flanges which may be joined to flanges of adjacent sections, as above stated, forming reinforcing members longitudinally of the hull and on opposite sides of the keel, thus providing sister-keelsons.

A still further object is the provision of a plastic vessel having the central longitudinal portion of its bottom surface or skin formed to provide a recess or groove for the reception of a plastic keel and securing said keel in position by a plastic fillet, thus rendering the structure homogeneous.

Still another object is to provide a double bottom hull of plastic construction for satisfying, particularly in naval landing craft, the following requirements: insured retraction from beaches even though in landing operations on a rocky shore or coral reef, the bottom of the hull becomes damaged during such operations; flotation even when capsized; provision for water ballast, and/or additional fluid cargo space if desired, and space for fresh water; provision for self-bailing bilge compartment in the cargo area, as well as satisfying other requirements hereinafter pointed out.

Other objects will appear hereinafter throughout the specification.

For illustrative purposes only, naval landing craft of the LCVP type have been illustrated in the drawings and set forth in the specification. Such landing craft exemplify one of the preferred forms only of the invention, however, inasmuch as features of the invention have general application to various types of ships and to small boats as well as to flying boats of various kinds, the type of vessel being immaterial.

In the drawings, which show the features of the present invention as at present devised:

Figure 1 is a top plan view of one form of the invention;

Figure 2 is a side elevation of the structure shown in Figure 1;

Figures 3A and 3B show an enlargement of the structure shown in Figure 1, partly broken away and partly in section;

Figures 4A and 4B show enlargements of the structure of Figure 2, partly broken away and partly in section;

Figure 5 is a vertical section taken on the line 5—5 of Figure 1;

Figure 6 is a vertical section on the line 6—6 of Figure 1;

Figure 7 is a vertical section on the line 7—7 of Figure 1;

Figure 8 is a perspective view of the skeg;

Figure 9 is a side elevation showing another form of the invention;

Figure 10 is a vertical section of one side of a ship taken on the line 10—10 of Figure 9;

Figure 11 is a front elevation of the outboard side of a ramp;

Figure 12 is a front elevation of the outboard side of a modified ramp; and

Figure 13 is a vertical section on the line 13—13 of Figure 12.

Referring to the drawings, in which like reference characters refer to similar and like parts throughout the several views, and in particular to Figures 1 to 4, A indicates the vessel as a whole, and this vessel includes a plurality of premolded transverse sections numbered 10, 12, 14, 16, 18, 20 and 22 of resinous plastic material, such as Fiberglas reinforced polyester resin or the like, which form the outer wall or skin of the hull when assembled. Where desired, certain of the sections may be molded to provide a top coaming 24 and with a toe rail 26 and a top edge fender 28.

Also, each hull section is molded with vertically spaced outboard stiffeners or welts 30 above its chine and extending generally fore and aft and, at the stern of the craft, the transom 32 is similarly formed with a toe rail 26 and stiffener welts 30. As shown in Figures 2 and 5, each section of the craft is molded with a plurality of welts 34 extending fore and aft on the exterior surface of its bottom and which also act as bottom stiffeners and scuff guards. Also, the plastic skin or shell 44 of all sections of the vessel have spaced transverse plastic welts 46 formed inboard thereon, as shown in Figures 2 and 6, which stiffen the sections transversely.

As can be seen from Figures 5, 6 and 7, the bottoms of said transverse hull sections 10, 12, 14, 16, 18, 20 and 22 may be molded separately to provide keel sections 58, thus permitting the hulls to be shipped in smaller units and, when assembled to provide a reinforcement for the hull bottom functioning is sister-keelsons—all being joined together as will be explained hereinafter.

The transverse hull 10, 12, 14, 16, 18, 20 and 22— more or less, or any of them, as may be required for a given vessel to be constructed—are formed, at the time of their molding, with their marginal edge or edges—that is to be joined to an adjacent section—turned inboard on an arc substantially proportionate to that shown in Figures 3A and 3B, to provide a lateral flange 50 terminating in a planar portion that will be in opposing and substantially parallel faying position with the terminal portion of the flange 50 on an adjacent hull section.

With the required sections of the hull pre-formed in complete transverse sections, as generally illustrated— or made in other subdivisions as may be required or desired for the specific purposes of a given vessel, but having at least the flanges 50 and, in some instances, the inboard welts 46—said hull sections are arranged in their order for assembly into a hull of a vessel. A resinous bonding solution (well known in the plastic art) is first applied to the outer faces of the opposing flanges 50 of adjacent sections and the faying surfaces of the planar portion of said flanges 50 are brought into tight contact by any conventional attaching means, not shown. With this accomplished, the arcuate walls of the flanges 60 of adjacent sections form a relatively wide recessed groove with its opposing walls diverging outboard and into which is applied a fillet 54 of plastic resinous material (preferably reinforced with Fiberglas) until the said plastic material is fair with the fairing-lines of the joined hull sections. When the resinous fillet 54 has set or "cured," the hull sections will be homogeneously joined by a connection having a strength greater than major portions of the sections and the inturned joined flanges 50 will form reinforcing rib members for the hull in the direction of their length.

One of the important features of the invention, although not all forms of the vessel will include the same, is the provision of the transversely extending sheet members 104 of Fiberglas reinforced polyester resin positioned at the transverse junctures of all or certain of said hull sections, as shown in Figures 3A, 3B, 4A and 4B, wherein the members 104 are shown at each of said transverse junctures. This sheet 104 may be in the form of a bulkhead, where required, or in the form of a belt-frame member (otherwise known as a U-shaped rib); but, in any case, its important function is to provide a transverse stiffener or reinforcing member between the joined flanges 50 of the abutting or juxtaposed hull sections. This transversely extending plastic sheet member 104 has its outboard marginal edge fashioned to the contour of the hull at the place where it will be employed so that said marginal edge may be interposed between the inwardly curved flanges 50 from one gunwale edge of the hull to the other. These members 104 are to be placed in position at the time the adjacent hull sections are assembled, as above described.

Another important feature of this invention is clearly shown in Figures 5, 6 and 7 wherein the shell wall of each hull section is deformed upwardly or inboard along its medial longitudinal bottom center to provide a recess 56 on its outboard surface so that when the hull sections are assembled and joined, said recessess of the sections form a continuous groove extending fore and aft of the vessel into which a molded plastic keel 62 is disposed and firmly held in place by a plastic resinous fillet 57—59 of the same type and character as the fillet 54. The keel 62, as shown particularly in Figures 8 and 9, is preferably built-up from polyester resin and Fiberglas and subjected to a molding operation. The keel is put in place at the time the hull sections are assembled and joined, as above described, by first placing the fillet in the groove 56 and inserting bolts of resinous material through holes in the wall of the groove 56 which align with threaded bolt holes 76 spaced along the top face of the keel 62; and upon tightening said bolts, the keel is brought into firm contact with the fillet material 54. While the bolts, just mentioned, are shown removed after the keel is in place, such bolt may be permitted to remain in place. Thereafter, the fillet 54 is built-up on both sides of the keel 62, as shown, producing a homogeneous structure with the walls of the keel grooves 56 when set and cured.

The keel groove 56 is preferably arcuate or substantially semi-circular in cross section, as shown in the drawings, thereby taking advantage of the strengthening power of a curve. In this case, the frame member 104 will be formed, as at 60, correspondingly with the formation of the skin 44 of the keel section forming the keel groove 56. It has been found that with such a keel assembly, a keelson is not needed as the keel recess or groove 56 lends such strength and rigidity to the boat fore and aft, in combination with the fillet 54, that all the functions of a keelson are served thereby.

In the finished hull, the joined flanges 50a and 50b will provide longitudinal stiffening and reinforcing members, functioning in the manner of sister-keelsons, extending fore and aft of the vessel for such distance as is practical in a given type of vessel, as shown in Figure 5 of the drawings, for instance.

The plastic keel 62, as shown in Figures 6, 7, 8 and 9, has a skeg strut 64 and a shoe 66, as indicated in the latter two figures, and has a shaft log 70, said log and strut having aligned shaft apertures 72 and 74 therein, respectively. The transverse stiffening or reinforcing members, that are inboard of the hull at or adjacent the keel, such as flanges 50 and frame member 104, are provided with limbers 78 for bilge drainage.

Should the vessel be a landing craft of the LCVP type, it is provided with a ramp 80 having a boundary welt 82, extending on all of its edges of its outboard surface, connected to stiffener welts 84, extending vertically of the ramp, and is provided with a window 88, as shown in Figure 11. The outboard face of the ramp may be provided, when desired, with an armor sheet 86, as indicated in Figures 12 and 13, and with window opening 90 aligned with the window 88. The inboard face 92 of the ramp is provided with a welt frame 94 on four sides thereof, having parallel stiffeners 96 which may be used as treads for vehicles passing over the ramp. As indicated in Figure 13, the space between the plates 86 and 92 is filled with flotation material 98, and the ramp is provided with a hingle 100 (Figure 4B).

In order to provide compartments, including bulkheads and tank storage space for water, as well as other tanks for fuel storage, the ship is provided with a plurality of horizontally and vertically extending sheets of molded resinous material 106, 108, and 110, as seen in Figures 3A, 3B, 4B, 5, 6 and 7. Each of the sections contains compartments forming tanks or bulkheads on both starboard and port sides of the ship. These compartments are completely watertight, by resinous fillets, applied where said sheet material engages the shell 44 or engage each other, as shown. The compartments in sections 10, 12 and 14 may be used for storage purposes, the compartment in section 16 may be a self-bailing bilge compartment, and the fuel and fresh water compartments may be located in sections 18, 20 and 22, although the arrangement of said compartments and their use will depend upon service and conditions. The sections may be used for shipment because each is cupped shaped. The air-tight compartments for water, etc. may be preferably added during assembly of the sections.

Armor may be provided for the sides of the vessel when desired, as shown in Figures 9, 10, 12 and 13, although such armor is not necessary due to the exceptional resistance of the skin, reinforced as it is on its exterior and interior by longitudinal and transverse welts. The armor consists of a sheet of plastic material 116 which extends from the ramp to adjacent the stern of the ship. The armor is fastened to welts 30 by partially melting the armor sheet on said welts, or by melting the welts, and the upper, lower and side edges are welded to the hull at 118, so as to provide a space for flotation material 122. The armor may also be held to the welts by additional fastening means 120, such as screws.

As indicated in Figure 1, the usual engine cover 36 is provided for the engine, and hatch covers 40 are provided for the self-bailing bilge well hereinafter described. Figure 1 also discloses the non-skid diamond pattern deck finish 42.

Important features of the present invention include the following:

1. An entirely plastic vessel having individual sections which are joined to each other by plastic means along the joining transverse meeting edges of adjacent sections.

2. A vessel composed of a plurality of sections having curved meeting skin portions of the juxtaposed sections with a fillet of plastic material filling out the space left by the inwardly curved skin portions.

3. The structure as mentioned under the preceding paragraph, wherein there is an interposed sheet or reinforcing member such as shown at 104 in Figures 3A, 3B, 4A and 4B. The bottom skin of the hull section deformed to provide a groove arcuate in cross-section, the keel 62, which is welded therein by a resinous fillet and eliminate the necessity for an inboard keelson.

4. Providing separate keel 58 joined to starboard and port side sections by arcuate flanges 50a and 50b of flanges 50, and by welts 46 having clamps 52, as previously described, and as shown in Figures 5, 6 and 7. Outboard fillets 54a complete the joining means to thereby form strong joints between these parts.

5. The provision of the plastic bulkheads or U belt-frame members indicated by reference numeral 104.

6. A vessel comprising a plurality of sections which may be of such shape that they can be nested from the point of manufacture to the staging point.

The above description and drawings disclose several embodiments of the invention and specific language has been employed in describing the several figures. It will nevertheless be understood that no limitations of the scope of the invention are thereby contemplated, and that various alterations and modifications may be made such as would occur to one skilled in the art to which the invention relates.

Having thus described the invention, what is claimed as new, and what is desired to be secured by Letters Patent is:

1. In a ship hull having its shell composed of resinous material, the bottom of said hull-shell being formed of at least one pre-molded section extending along the longitudinal center portion of the hull, the marginal edge portions of said bottom section and of the adjacent hull shell being formed with arcuately turned lateral flanges in contiguous relation with each other and forming a fillet receiving groove on their facing surfaces, and a fillet of resinous material in said last mentioned grooves bonding the parts together whereby said joined flanges of said bottom section and of said adjacent hull-shell, that extend longitudinally of the hull, provide reinforcing sister-keelsons on opposite sides of the longitudinal medial center of the hull.

2. The subject matter of claim 1, wherein there are spaced stiffening welts of resinous material bonded on the inboard surface of the hull-shell and on the bottom section and positioned and extending transversely of the hull in substantial alignment, said welts crossing and following the contour of said bonded arcuate marginal portions and in bonding contact therewith, whereby to further reinforce the bond between the bottom section and said hull-shell.

3. A hull for a ship or boat having its shell walls constructed of molded resinous material, portions of the wall of said shell forming the bottom of the hull being offset inwardly of the hull along the longitudinal medial line thereof and providing a groove longitudinally of and facing outwardly of the hull to receive a keel, and a keel of resinous material disposed under and having a portion thereof extending into said keel groove, and a fillet of resinous material between said keel and the walls of said keel groove homogeneously securing the keel to the hull, whereby said inwardly offset portion functions as a keelson.

4. The subject matter of claim 3 wherein the bottom shell wall of the hull is at least one separate section, the longitudinal side marginal portions of said section and the adjacent marginal portions of the hull being formed with arcuately inturned lateral flanges having terminating planar surfaces in faying position and bonded by a resinous material and providing a flaring fillet receiving groove outboard of the hull on opposite sides of the keel, and a fillet of resinous material in said last mentioned grooves built-out fair with fairing lines of said hull, whereby said bonded flanges form sister-keelsons.

5. In a ship hull constructed of a plurality of assembled hull shell sections each composed of molded resinous material, said sections having their adjacent marginal edge portions turned inboard arcuately to provide an outwardly flaring fillet receiving groove therebetween and outboard of the hull, and a fillet of resinous material filling said groove and built-up upon said flaring surfaces thereof in bonding contact therewith to the faying line of the assembled hull, the said hull bottom being formed of a plurality of bottom sections of resinous material, the intermediate longitudinal portion of said bottom sections being arcuately offset inwardly to form a keel-receiving groove, a keel disposed at least partially in said keel-receiving groove, resinous bolts extending through said offset portions into said keel and holding the keel in said groove, said fillet of resinous material bonding said keel in position.

6. In a ship hull having its shell composed of resinous material, the bottom of said hull-shell being formed of at least one pre-molded section extending along the longitudinal center portion of the hull, the marginal edge portions of said bottom section and of the adjacent hull-shell being formed with arcuately turned lateral flanges in contiguous relation with each other and forming a fillet receiving groove on their outboard surfaces, and a fillet of resinous material in said last mentioned groove bonding the parts together whereby said joined flanges of said bottom section and of said adjacent hull-shell, that extend longitudinally of the hull, provide reinforcing sister-keelsons on opposite sides of the longitudinal medial center of the hull, said hull being composed of a plurality of sections having juncture surfaces extending transversely to the longitudinal axis of the ship, the juncture surfaces of adjacent sections providing an outwardly flaring fillet receiving groove, and a fillet of resinous material in said groove in bonding contact therewith.

7. In a ship hull constructed of a plurality of assembled hull shell sections each composed of molded resinous material, said sections having their adjacent marginal edge portions turned inboard arcuately to provide an outwardly flaring fillet receiving groove therebetween and outboard of the hull, and a fillet of resinous material filling said groove and built-up upon said flaring surfaces thereof in bonding contact therewith to the faying line of the assembled hull, the said hull bottom being formed of a plurality of bottom sections of resinous material, the intermediate longitudinal portion of said bottom sections being arcuately offset inwardly to form a keel-receiving groove, a keel disposed at least partially in said keel-receiving groove, resinous bolts extending through said offset portions into said keel and holding the keel in said groove, said fillet of resinous material bonding said keel in position, and a plurality of transverse stiffening welts of resinous material bonded to the inboard surfaces of said sections, and wherein at least some of said welts cross and follow the contour of said bonded arcuate marginal portions, the said welts being in bonding contact therewith, whereby to further reinforce the bond between said sections.

8. A hull for a ship or boat having its shell walls constructed of molded resinous material, portions of the wall of said shell forming the bottom of the hull being offset inwardly of the hull along the longitudinal medial line thereof and providing a groove longitudinally of and facing outwardly of the hull to receive a keel, and a keel of resinous material disposed under and having a portion thereof extending into said keel groove, and a fillet of resinous material between said keel and the walls of said keel groove homogeneously securing the keel to the hull, whereby said inwardly offset portion functions as a keelson, the said shell walls being composed of a plurality of sections having planar juncture surfaces extending transversely to the longitudinal axis of said shell, a bracing member between each pair of facing planar surfaces, and resinous material in bonding contact with adjacent planar juncture surfaces and the bracing member between them whereby to bind said sections to each other.

9. In a ship hull having its shell composed of resinous material, the bottom of said hull-shell being formed of at least one pre-molded section extending along the longitudinal center portion of the hull, the marginal edge portions of said bottom section and of the adjacent hull shell being formed with arcuately turned lateral flanges in contiguous relation with each other and forming a fillet receiving groove on their facing surfaces, and a fillet of resinous material in said last mentioned groove bonding the parts together whereby said joined flanges of said bottom section and of said adjacent hull-shell, that extend longitudinally of the hull, provide reinforcing sister-keelsons on opposite sides of the longitudinal medial center of the hull, the said shell walls being composed of a plurality of sections having planar juncture surfaces extending transversely to the longitudinal axis of said shell, a bracing member between each pair of facing planar surfaces, and resinous material in bonding contact with adjacent planar juncture surfaces and the bracing member between them whereby to bind said sections to each other.

References Cited in the file of this patent

UNITED STATES PATENTS

| Number | Name | Date |
|---|---|---|
| 1,050,480 | Lundin et al. | Jan. 14, 1913 |
| 1,173,432 | Jacobs | Feb. 29, 1916 |
| 1,295,117 | Campbell | Feb. 25, 1919 |
| 1,364,626 | Ewertz | Jan. 4, 1921 |
| 1,694,790 | Nelson | Dec. 11, 1928 |
| 2,018,865 | Odenbach et al. | Oct. 29, 1935 |
| 2,049,968 | Mead | Aug. 4, 1936 |
| 2,122,300 | Smith, Jr., et al. | June 28, 1938 |
| 2,220,545 | Reinhardt | Nov. 5, 1940 |
| 2,330,022 | Baier | Sept. 21, 1943 |
| 2,326,080 | Van Hoorn | Aug. 3, 1943 |
| 2,341,866 | Higgins | Feb. 15, 1944 |
| 2,342,023 | Vidal et al. | Feb. 15, 1944 |
| 2,376,753 | Bowen | May 22, 1945 |
| 2,378,801 | Sidell et al. | June 19, 1945 |
| 2,427,065 | Nebesar | Sept. 9, 1947 |
| 2,453,463 | Sherman | Nov. 9, 1948 |
| 2,511,816 | Shaw | June 13, 1950 |
| 2,547,146 | Anthony | Apr. 3, 1951 |
| 2,569,611 | Jenkins | Oct. 2, 1951 |

FOREIGN PATENTS

| Number | Country | Date |
|---|---|---|
| 16,278 | Great Britain | 1904 |
| 49,461 | France | Jan. 17, 1939 |
| | (1st addition to Patent 729,245) | |
| 470,834 | Great Britain | Nov. 15, 1935 |
| 523,711 | Great Britain | July 22, 1940 |
| 815,011 | Germany | Sept. 27, 1951 |
| 955,794 | France | July 4, 1949 |

OTHER REFERENCES

Modern Plastics, December, 1950, page 75.

Modern Plastics, vol. 27, No. 1, September, 1949, pp. 103–107, inclusive

Motor Boat, vol. 47, No. 3, March, 1950, pp. 11–13, 50, and 52–54.